US011033140B2

(12) United States Patent
Myers et al.

(10) Patent No.: US 11,033,140 B2
(45) Date of Patent: Jun. 15, 2021

(54) SYSTEM AND METHOD FOR FLUID TEMPERATURE STABILITY FOR MULTI-SECTION BEVERAGE MAKING MACHINE

(71) Applicant: Mavam Espresso, Seattle, WA (US)

(72) Inventors: Michael Gregory Myers, Seattle, WA (US); Terrance David Ziniewicz, Olympia, WA (US)

(*) Notice: Subject to any disclaimer, the term of this patent is extended or adjusted under 35 U.S.C. 154(b) by 58 days.

(21) Appl. No.: 15/213,345

(22) Filed: Jul. 18, 2016

(65) Prior Publication Data

US 2018/0014686 A1 Jan. 18, 2018

(51) Int. Cl.
A47J 31/30 (2006.01)
B67D 7/82 (2010.01)
A47J 31/56 (2006.01)

(52) U.S. Cl.
CPC ............ *A47J 31/306* (2013.01); *A47J 31/56* (2013.01); *B67D 7/82* (2013.01)

(58) Field of Classification Search
CPC .......... A47J 31/306; A47J 31/56; A47J 31/54; A47J 31/007; A47J 31/46; A47J 2201/00; A47J 31/542; A47J 31/4489; B67D 7/82; B67D 1/0895; F16L 53/30; F16L 53/38
USPC ....... 222/146.2, 146.1, 146.4, 146.5; 99/295, 99/293
See application file for complete search history.

(56) References Cited

U.S. PATENT DOCUMENTS 3,378,673 A 4/1968 Hopper
4,455,474 A 6/1984 Jameson et al.
4,484,515 A 11/1984 Illy
5,000,082 A * 3/1991 Lassota ................. A47J 31/057
    222/464.1
5,281,309 A * 1/1994 Greene ................. B01D 1/0017
    202/181
5,367,607 A 11/1994 Hufnagl et al.
5,778,765 A * 7/1998 Klawuhn ................ A47J 31/46
    99/290
5,950,867 A * 9/1999 Martindale .............. B67D 7/02
    222/1
6,641,304 B1 * 11/2003 Ang ........................ F16L 11/12
    236/93 R
7,203,419 B2 * 4/2007 Malone ................... F16L 53/38
    392/468

(Continued)

FOREIGN PATENT DOCUMENTS

WO    WO2016034255    *  3/2016

*Primary Examiner* — Patrick M. Buechner
*Assistant Examiner* — Robert K Nichols, II
(74) *Attorney, Agent, or Firm* — Christopher Mayle; Thomas E. LaGrandeur; Bold IP, PLLC

(57) ABSTRACT

A beverage making machine where the main machine is located under the counter out of the view of the customers. This new design allows for the machine to be built in sections instead of inserting all components into one device and allows for easy servicing. Using electrically heated hoses allows for the main user interface to be located any distance away from the brewing machine, which frees up counter space and allows for easier servicing. The electrically heated hoses are a key component to this machine because the hose is electrically heated to maintain a desired temperature level so that heated fluids do not lose heat upon transfer from boiler to dispenser, making this machine a temperature stable coffee/espresso machine.

12 Claims, 5 Drawing Sheets

(56) References Cited

U.S. PATENT DOCUMENTS

| | | | | |
|---|---|---|---|---|
| 7,861,646 B2* | 1/2011 | Bockbrader | .......... | A47J 31/402 |
| | | | | 222/146.1 |
| 8,850,957 B2 | 10/2014 | Aemisegger et al. | | |
| 9,364,116 B2* | 6/2016 | Waldron | .................. | A47J 31/46 |
| 9,644,776 B2* | 5/2017 | Westmeier | .............. | F16L 53/38 |
| 2012/0183659 A1* | 7/2012 | Hulett | ..................... | A23F 5/262 |
| | | | | 426/431 |
| 2012/0240784 A1* | 9/2012 | Yang | ................... | A47J 31/4403 |
| | | | | 99/293 |
| 2015/0305551 A1* | 10/2015 | Rosati | ....................... | A23F 3/18 |
| | | | | 426/231 |
| 2016/0213193 A1* | 7/2016 | Liu | ......................... | A47J 31/54 |

\* cited by examiner

SYSTEM AND METHOD FOR FLUID TEMPERATURE STABILITY FOR MULTI-SECTION BEVERAGE MAKING MACHINE

FIELD OF THE DISCLOSURE

This disclosure relates generally to beverage making machines. More specifically, this disclosure relates to a system and method for fluid temperature stability for a multi-section beverage making machine.

BACKGROUND

Present day espresso machines are built with the boiler system and the dispensing system placed in close proximity of one another, usually integrated into a singular housing, in order to minimize water or steam temperature fluctuations during extraction as the water or steam travels from the boiler system to the dispensing system through a throughway such as a hose or a pipe.

Because of this singular housing design, present day espresso machines tend to be bulky, especially in commercial units that require large amounts of water and thus, larger boilers to accommodate the higher output of product. Larger boilers lead to larger machines which means less room on the counter for the user to work on. Additionally, larger espresso machines unfortunately often block views, preventing interaction between employees and customers, and that employee-customer interaction, along with good coffee, is important for achieving that iconic coffee shop atmosphere that draws and retains loyal customers.

Separating the boiler system from dispensing system would solve the problem of having a large machine, but because fluids lose energy as they travel along pipes or hoses, storing the boiler system away from the dispensing system would require water or steam to travel along greater distances and lose heat, which would result in coffee brewed at suboptimal temperatures, further resulting in a low quality product.

The present invention allows for the beverage making machine to be built in sections instead of inserting all components into one device or within a confined area. Having a machine built in sections and setting up different sections in different areas frees up counter space and allows for easier servicing of the machine. With the use of an electrically heated hose, the boiler system can be located any distance away from the dispensing system to achieve the present invention. The electrically heated hose is a heating element that allows the user to maintain temperatures of water or steam within the electrically heated hose so that no temperature is lost during extraction as the water or steam travels from the boiler system to the dispensing system. This solves the problem of temperature fluctuation in espresso machines with their boiler systems separated from their dispenser systems.

For the foregoing reasons, there is a need for a system or method for fluid temperature stability for a multi-section beverage making machine.

More Reference to, and discussion of, the foregoing background is not presented as prior art and is respectfully submitted that none of the above-indicated patents and patent applications disclose, teach, suggest, show, or otherwise render obvious, either singly or when considered in combination, the invention described and claimed herein.

SUMMARY

The present invention allows for the beverage making machine to be built in sections instead of inserting all components into one device or within a confined area. Having a machine built in sections and setting up different sections in different areas frees up counter space and allows for easier servicing of the machine. With the use of an electrically heated hose, the boiler system can be located any distance away from the dispensing system to achieve the present invention. The electrically heated hose is a heating element that allows the user to maintain temperatures of water or steam within the electrically heated hose so that no temperature is lost during extraction as the water or steam travels from the boiler system to the dispensing system. This solves the problem of temperature fluctuation in espresso machines with their boiler systems separated from their dispenser systems.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The disclosure presented herein relates to a system and method for fluid temperature stability for a multi-section beverage making machine. In one, non-limiting embodiment, the system includes a dispensing system, a boiler system, a removable electrically heated hose, and an electronic temperature control unit. The boiler system includes at least one boiler unit. The removable electrically heated hose includes at least two ends, and an electrical connection to a power supply.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose limit is the second number. For example, 25 to 100 mm means a range whose lower limit is 25 mm and upper limit is 100 mm.

Figure 1:
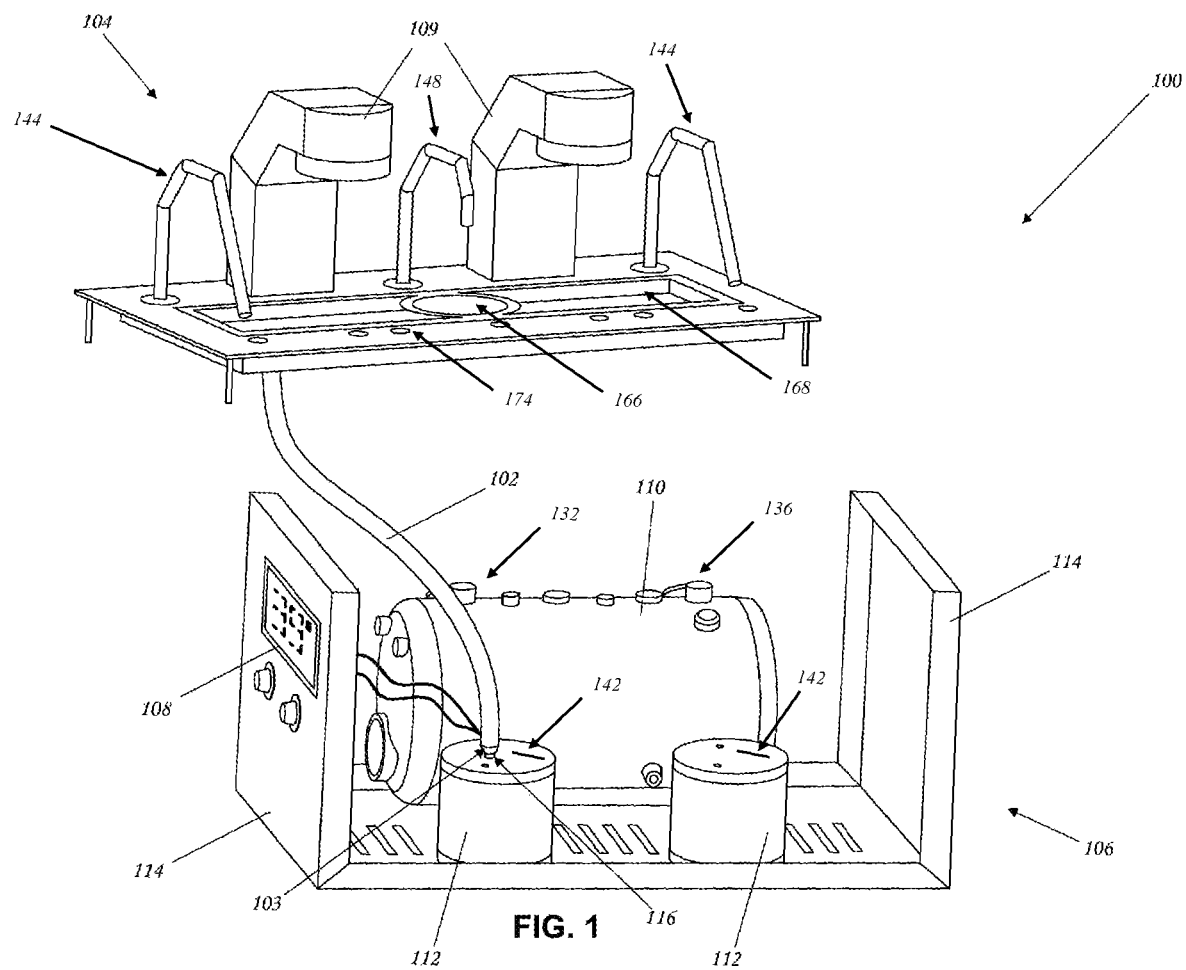
FIG. 1 is a perspective view depicting the system.

FIG. 1 is a perspective view depicting a multi-section beverage making machine ("system") 100. In one or more non-limiting embodiments, the system 100 may include a removable electrically heated hose ("heated hose") 102, two independent systems including a dispensing system 104 and a boiler system 106, and an electronic temperature control unit ("ETCU") 108. The dispensing system 104 and the boiler system may be independent of one another and installed at separate locations away from one another A removable electrically heated hose 102 may be attached to both the dispensing system 104 and the boiler system 106 so that water can be transferred from the boiling system 106 to the dispensing system 104 and be used for making beverages including espresso and other coffee based beverages.

The dispensing system 104 may be used for beverage preparation. In some embodiments, the dispensing system 104 may have one or more group heads 109 that dispenses water that is heated in a boiler system 106 and transferred through a heated hose 102 to the one or more group heads 109. To avoid heat loss during the fluid extraction process or during the transfer of water from the boiler system 106 to the dispensing system 104, the one or more group heads 109 may have a cartridge heater inserted into the surface of the group head 109. The cartridge heater is a heating element powered by an electronic temperature control unit such as a proportional-integral-derivative ("PID") controller or control loop. The dispensing system 104 may use steam or hot water to create different beverages. The one or more group heads 109 may have steam and hot water output means that may be spouts, spigots, and wands such as steam output 144 and hot water output 148. After steaming of extracting espresso there is always milk and coffee residue to clean. To avoid a trip to the sink or dirty dish pile, the dispensing system 104 may have a drain 168 and a pitcher rinser 166 built into the drain. The pitcher rinser is a device that uses incoming cold or hot water and has a small actuator that opens when you press down on the rinser 166, supplying water to clean. The dispensing system 104 may also include buttons such as buttons 174 for activating different valves and pumps to create coffee based drinks. For instance, the buttons 174 may include a steam valve actuation button, which activates a pump for extracting espresso, turns on a brew valve letting water flow from the one or more group heads 109, and activates a hot water valve.

In some embodiments, the boiler system 106 may include an ETCU 108, a steam boiler 110, a brew boiler 112, and a housing 114 to hold the boiler system 106 in place. A boiler system 106 is generally where all incoming electrical power and water is imputed into a beverage making machine such as an espresso machine or the system 100. The water is heated and power is distributed to all other components of the machine. The housing 114 may the boilers used for creating steam and hot water, including the steam boiler 110 and the brew boiler 112, respectively. The incoming water enters the steam boiler 110, which may have heat exchangers built into steam boiler 110 at 132 and 136 that have water run through the center of the steam boiler 110 vertically. The water used to create steam and the steam vapor heats the heat exchanger metal which heats water passing through heat exchangers 132 and 136. The heated water then moves from heat exchangers 132 and 136 to the brew boiler 112.

The ETCU 108 may control and regulate the temperature of the water in a brew boiler 112. The brew boiler takes the incoming heated water and adds a small amount of cold restricted water through a water restrictor input 142 to keep the water close to the extraction temperature set point. The ETCU 108 controlled brew boiler 112 maintain and regulate the water temperature at a predetermined extraction temperature set point needed to create coffee set by the user. A removable electrically heated hose 102 may be fastened to the brew boiler 112 at a nozzle 116 or opening, and the water may be transferred from the brew boiler 112 to the dispensing system 104 through the heated hose 102. The steam boiler 110 may also heat water and create steam pressure.

In some embodiments, the heated hose 102 regulates and maintains the temperature of water in the system 100 when water travels from the boiler system 106 to the dispensing system 104. Once water has been heated to optimal or the desired temperature in the boiler system 106, the fluid needs to be transferred from the boiler system to the dispensing system. To prevent temperature or energy loss in the fluid as the fluid travels from boiler system to dispensing system, a user can enter a predetermined temperature level in an ETCU 108 which would heat the heated hose 102 to the predetermined temperature level and maintain the level to prevent fluctuations in water temperature. Any heated water or fluids that pass through the heated hose 102 once the predetermined temperature level has been set will not lose energy or heat as it travels through the heated hose 102 in this state.

The temperature level of heated hose 102 may be adjustable and can create different levels of superheated and saturated steam mixtures as desired, such as for steaming milk.

In some embodiments, the heated hose 102 may have a heated tip 103 powered by an electrical connection and wires connected to an ETCU 108, and this heated tip eliminates any heat loss at a valve system to hose junction. This is important because surface area temperature within the group head 109 has to be consistent with the temperature set by the user through the PID controller to achieve temperature control. The one or more group heads 109 may have heating elements built in and work with the solenoid valve to keep the system within the chambered group head housing at any desired temperature.

Figure 2:
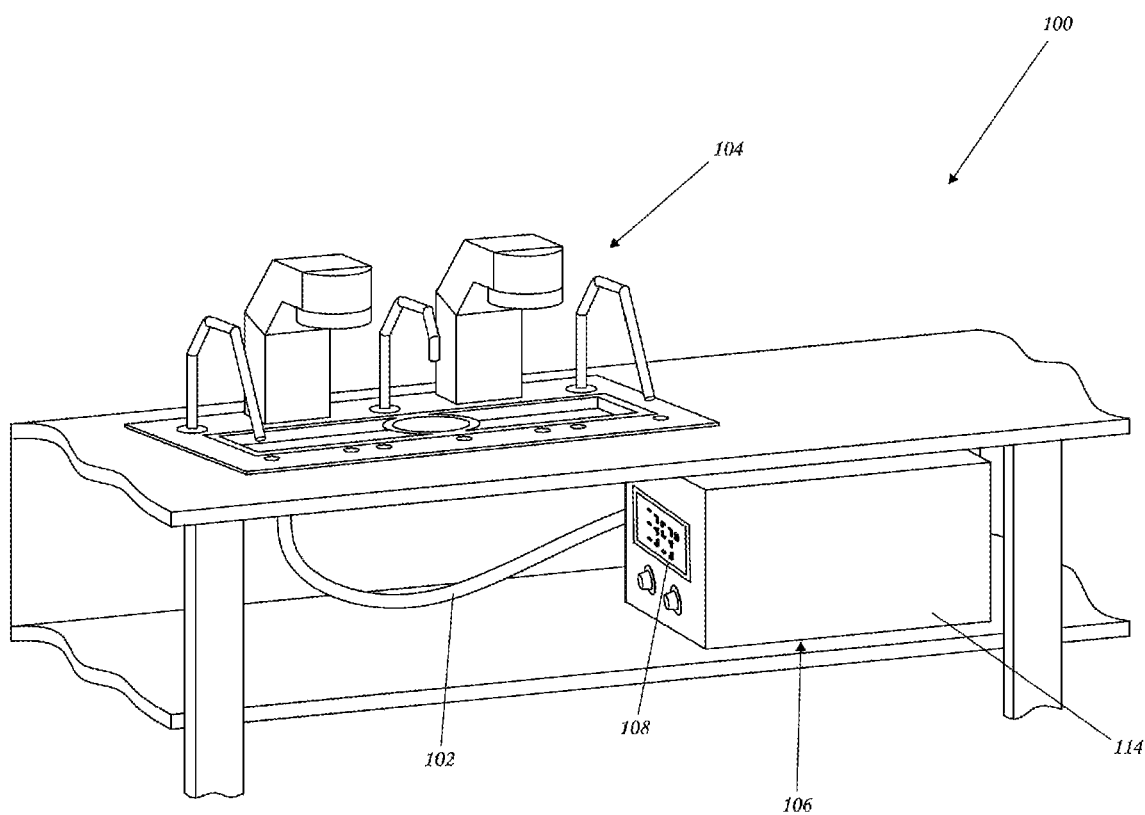
FIG. 2 is a perspective view depicting a diagram of the system of FIG. 1 in use.

FIG. 2 is a perspective view depicting the system 100. In one or more embodiments, the dispensing system 104 and the boiler system 106 may be separately installed away from the dispensing system 104 and at any distance desired by the user. A user may use a heated hose 102 of any desired predetermined length to connect the dispensing system 104 to the boiler system 106. The heated hose 102 allows the dispensing system 104 and the boiler system 106 to be located separately at any desirable predetermined length and with proper temperature regulation. This proper temperature regulation prevents heat loss during the transfer of fluids from the boiler system 106 to the dispensing system 104 when a user wishes to pull fluids and create a beverage without compromising the quality of the beverage that would otherwise occur if heat or energy is lost during the transfer of fluid from the boiler system 106 to the dispensing system 104.

Figure 3:
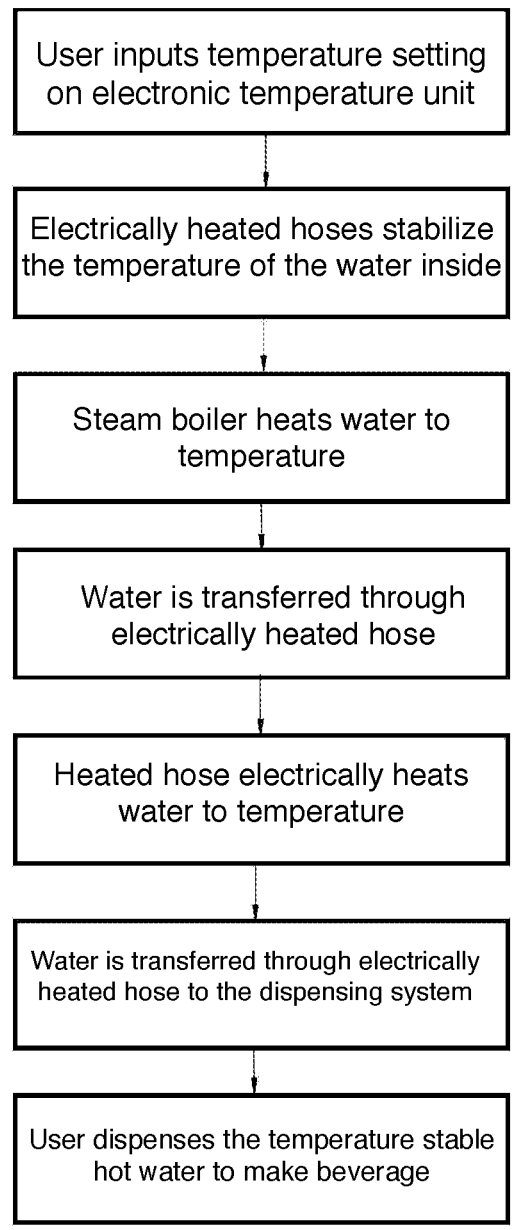
FIG. 3 is a flow chart depicting a method for brewing temperature controlled beverage.

FIG. 3 is a flow chart depicting the flow of water through the system 100 once the user has chosen a desired temperature to use water to create a beverage.

Figure 4:
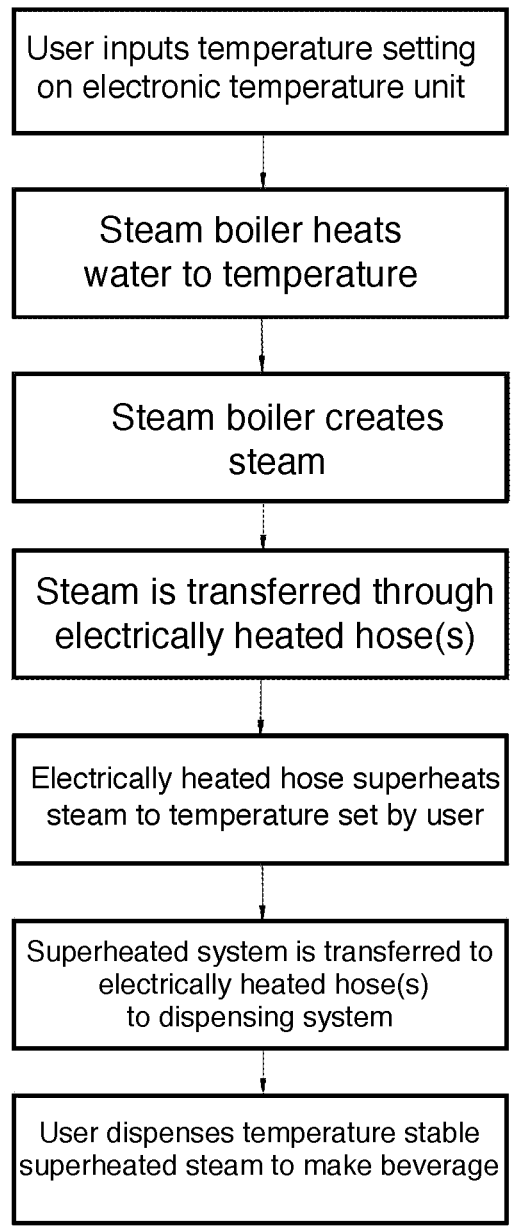
FIG. 4 is a flow chart depicting a method for brewing temperature controlled beverage.

FIG. 4 is a flow chart depicting the flow of steam through the system once the user has chosen a desired temperature to use steam to create a beverage.

Figure 5:
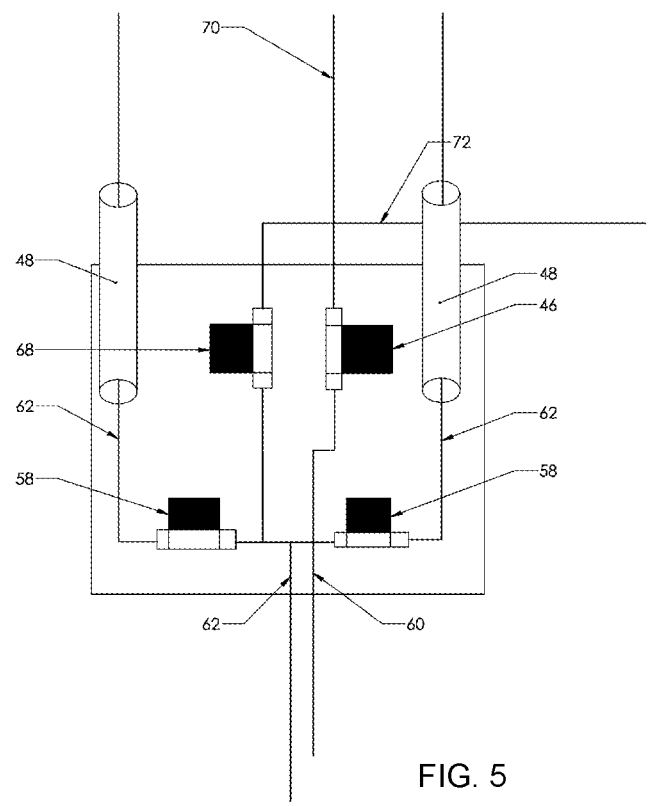
FIG. 5 is a block diagram representation showing the steam transfer portion of the dispensing system.

FIG. 5 is block diagram representation of a group head of the dispensing system that shows the different heating elements and heating valves. This uses the incoming steam pressure and water from the steam boiler and has multiple solenoid valves that store steam and hot water within the dispensing system until needed to be used. The electrically heated hoses or tubes 48 are removably coupled to the steam solenoid valve 58 and a condensate valve 68. The incoming insulated steam tube 62 is fed to steam solenoid valve 58 and condensate valve 68. Condensate valve 68 is a solenoid valve with a timer, and opens and closes periodically to remove all water that has pooled in steam tubes 62. Steam solenoid valve 58 opens and closes to allow steam to travel to steam output 144 located on dispensing system 104. As steam sits in steam tube 62 it loses energy or heat and the steam turns back to water, and this water begins to pool in steam tubes 62. The pooled water is transferred to a drain via a separate drain tube 70. This allows the steam to be dry but still saturated. To further the drying effect of the steam electrically heated hose or tubing 48 is added to the output of the steam tubing. Setting the electrically heated hose or tubing to above the temperature of the steam creates superheated steam which further vaporizes the water in the saturated steam traveling through the electrically heated hose or tubing.

The temperature of the electrically heated hose or tubing is adjustable and can create different levels of superheated and saturated steam mixtures desired, such as for steaming milk. Water comes from steam boiler into incoming hot water tube 60, the water is then fed to the solenoid valve 46, and from there water is transferred to the hot water output 18 via hot water output pipe 72.

While preferred and alternate embodiments have been illustrated and described, as noted above, many changes can be made without departing from the spirit and scope of the SYSTEM AND METHOD FOR FLUID TEMPERATURE STABILITY FOR MULTI-SECTION BEVERAGE MAKING MACHINE. Accordingly, the scope of the SYSTEM AND METHOD FOR FLUID TEMPERATURE STABILITY FOR MULTI-SECTION BEVERAGE MAKING MACHINE not limited by the disclosure of these preferred and alternate embodiments. Instead, the scope of the invention title be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features. Any element in a claim that does not explicitly state "means for" performing a specified function, or "step for" performing a specific function is not to be interpreted as a "means" or "step" clause as specified in 35. U.S.C. § 112 ¶6. In particular, the use of "step of" in the claims herein is not intended to invoke the provisions of U.S.C. § 112 ¶16.

We claim:

1. A system for a multi-section beverage making machine, the system comprising:
   a dispensing system;
   a boiler system;
   one or more first electrically heated hoses; the one or more first electrically heated hoses configured to allow water to pass through to the dispensing system, and
   an electronic temperature control unit;
   the dispensing system comprising one or more group heads, the one or more group heads configured to dispense water from the boiler system;
   the boiler system being independent from the dispensing system, the one or more first electrically heated hoses configured to connect to the boiler system and dispensing system;
   the boiler system comprising one or more steam boilers and one or more brew boilers;
   the electronic temperature control unit comprising one or more temperature value input means;
   the steam boiler configured, in response to an input temperature received by the electronic temperature control unit, to heat water stored in the steam boiler to the inputted temperature; and
   wherein in response to an input temperature received by the electronic temperature control unit, the one or more first electrically heated hoses are configured to be heated to a desired temperature, wherein the one or more first electrically heated hoses are maintained at the desired temperature such that there is no temperature loss of the water throughout the one or more first electrically heated hoses between the boiler system and the dispensing system;
   wherein the one or more group heads comprise a heating element to prevent temperature loss of fluids upon transfer, the one or more group heads comprising a steam solenoid valve and a condensate valve configured to be fed steam through one or more steam tubes from the boiler system, the condensate valve having a timer, the condensate valve configured to open and close to remove the water that has pooled in the one or more steam tubes and transfer to a drain by a drain tube, the one or more steam tubes configured to remove heat and energy from steam sitting in the steam tube wherein the steam turns back into the water, the steam solenoid valve configured to open and close to permit the steam to travel to a steam output on the dispensing system wherein one or more second electrically heated hoses are positioned at the steam output to further the drying effect, wherein the one or more second electrically heated hoses are maintained at the desired temperature such that the one or more second electrically heated hoses are configured to remove the water in the steam lines by super heating the steam to control the amount of the water.

2. The system of claim 1, the one or more first electrically heated hoses positioned outside a boiler housing of the boiler system and the dispensing system, wherein the one or more electrically heated hoses are configured to be removable.

3. The system of claim 2, the one or more first electrically heated hoses comprising a heated tip, the heated tip configured to prevent heat loss.

4. The system of claim 3, the one or more group heads having a cartridge heater inserted into a surface of the head, a surface area temperature within the group head configured to be consistent with the temperature set through the electronic temperature control unit to achieve temperature control.

5. The system of claim 4, the one or more group heads having outlet means such as a spout, a spigot, or a wand.

6. The system of claim 2, further comprising a pitcher rinser built into the drain, the pitcher rinser comprising an actuator, the actuator configured to open, wherein when the actuator is pushed down, water is supplied to clean the drain.

7. The system of claim 6, wherein the dispensing system comprises a plurality of buttons to actuate different fluid types, the buttons including a steam valve actuation button, configured to activate a pump for extracting espresso and cause water flow from the one or more group heads.

8. The system of claim 7, wherein the electronic temperature control unit comprises a plurality of temperature control interfaces to set different temperature values.

9. The system of claim 8, the steam boiler further comprising one or more heat exchangers that run through the center of the steam boiler vertically wherein the heated water is configured to move from the one or more heat exchangers to the brew boiler, wherein the electronic temperature control unit is configured to control and regulate the temperature of the heated water in the brew boiler, wherein the brew boiler is configured to add an amount of cold water from a waster restrictor input to the heated water coming into to the brew boiler.

10. The system of claim 1, the boiler system comprising one or more steam boilers and one or more brew boilers;
the electronic temperature control unit comprising one or more temperature value input means; and
the steam boiler configured, in response to an input temperature received by the electronic temperature control unit, to heat water stored in the steam boiler to the inputted temperature, wherein the steam boiler further comprises multiple heat exchangers configured to allow water to run through the center of the steam boiler vertically.

11. The system of claim 10, the one or more group heads having a cartridge heater inserted into the surface of the head, the one or more group heads having outlet means such as a spout, spigot, or wand, the one or more group heads comprising a heating element configured to be coupled to a solenoid valve to prevent temperature loss of fluids upon transfer, the surface area temperature within the group head configured to be consistent with the temperature set through the electronic temperature control unit to achieve temperature control.

12. The system of claim 11, further comprising a drain configured to allow drainage to a floor or water disposal system, a pitcher rinser built into the drain, the pitcher rinser comprising an actuator, the actuator configured to open, wherein when opened, water is supplied to clean the drain.

\* \* \* \* \*